United States Patent
Govindan et al.

(10) Patent No.: US 12,153,940 B2
(45) Date of Patent: *Nov. 26, 2024

(54) PATH-DRIVEN USER INTERFACE

(71) Applicant: Wells Fargo Bank, N.A., San Francisco, CA (US)

(72) Inventors: Rajeswaran Govindan, Livermore, CA (US); Margaret Seter Honeycutt, Crockett, CA (US); Wyman Yu, San Francisco, CA (US); Jason V. Biala, Martinez, CA (US); Ryan Lee Hammond, San Jose, CA (US); Dennis E. Montenegro, Concord, CA (US); Christopher Sipanya, San Jose, CA (US); Sergey Yamandiy, Castro Valley, CA (US); Miriam Felecia Clark, San Francisco, CA (US); Jason Huang, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/348,006

(22) Filed: Jul. 6, 2023

(65) Prior Publication Data
US 2023/0409354 A1 Dec. 21, 2023

Related U.S. Application Data

(63) Continuation of application No. 17/807,649, filed on Jun. 17, 2022, now Pat. No. 11,734,029.

(51) Int. Cl.
*G06F 3/048* (2013.01)
*G06F 9/451* (2018.01)
*G06Q 10/1093* (2023.01)

(52) U.S. Cl.
CPC ......... *G06F 9/451* (2018.02); *G06Q 10/1095* (2013.01)

(58) Field of Classification Search
CPC ............................ G06F 9/451; G06Q 10/1095
See application file for complete search history.

(56) References Cited

U.S. PATENT DOCUMENTS

| 9,630,109 B2 | 4/2017 | Herzig et al. |
| 10,997,670 B1 | 5/2021 | Anzalone et al. |

(Continued)

FOREIGN PATENT DOCUMENTS

WO WO-2015017919 A1 2/2015

OTHER PUBLICATIONS

"U.S. Appl. No. 17/807,649, Corrected Notice of Allowability mailed Apr. 19, 2023", 2 pgs.

(Continued)

*Primary Examiner* — Mahelet Shiberou
(74) *Attorney, Agent, or Firm* — SCHWEGMAN LUNDBERG & WOESSNER, P.A.

(57) ABSTRACT

A method may include retrieving, from a data store, an environment template data file; parsing the environment template data file to identify: path data; an amount of events; and display location information with respect to each event in the amount of events; accessing a user profile identifying scheduled events for a user; for a first event in the scheduled events for the user, predicting using at least one processor, a set of decisions associated with the first event, and a set of impact determinations for each respective decision in the set of decisions; generating, using the processing device, a user interface based on the path data, the amount of events, the display location information, the set of decisions associated with the first event, and the set of impact determinations for each respective decision in the set of decisions; and presenting the user interface on a computing device of the user.

17 Claims, 6 Drawing Sheets

(56) References Cited

U.S. PATENT DOCUMENTS

| | | |
|---|---|---|
| 2014/0335955 A1 | 11/2014 | Thomas et al. |
| 2016/0086121 A1 | 3/2016 | Heilbrunn et al. |
| 2020/0372823 A1 | 11/2020 | Edwards et al. |
| 2021/0201239 A1 | 7/2021 | Milkovic et al. |
| 2021/0233166 A1 | 7/2021 | Coulter |
| 2021/0294485 A1* | 9/2021 | Li ................ G06Q 10/1097 |

OTHER PUBLICATIONS

"U.S. Appl. No. 17/807,649, Examiner Interview Summary mailed Feb. 10, 2023", 2 pgs.

"U.S. Appl. No. 17/807,649, Non Final Office Action mailed Dec. 8, 2022".

"U.S. Appl. No. 17/807,649, Notice of Allowance mailed Apr. 3, 2023", 8 pgs.

"U.S. Appl. No. 17/807,649, Response filed Mar. 8, 2023 to Non Final Office Action mailed Dec. 8, 2022", 10 pgs.

"Homey app for Chores, Rewards and Allowance—Homey app for families", © HomeyLabs Inc., [Online]. Retrieved from the Internet: <URL: https://www.homeyapp.net/>, (Accessed Nov. 12, 2021), 11 pgs.

Kappen, Dennis, et al., "Deconstructing 'Gamified' Task-Management Applications", Gamification Proceedings, [Online]. Retrieved from the Internet: <URL: https://doi.org/10.1145/2583008.2583034>, (Oct. 2013), 4 pgs.

* cited by examiner

PATH-DRIVEN USER INTERFACE

PRIORITY CLAIM

This patent application is a continuation of U.S. patent application Ser. No. 17/807,649, filed Jun. 17, 2022, which is hereby incorporated by reference herein in its entirety.

BACKGROUND

Users are often turn to applications or websites help manage their events/appointments. The use of an electronic organizer provides functionality that is not able to exist with a hard copy written calendar system. For example, a user may be able to add or remove events from numerous computing devices regardless if one device is left at home. Whereas, if a paper system is used, a user may not be able to add an event if their hard copy was left behind. Similarly, electronic calendars allow for integration with other electronic systems to allow events to be automatically added without the user needing to add them.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
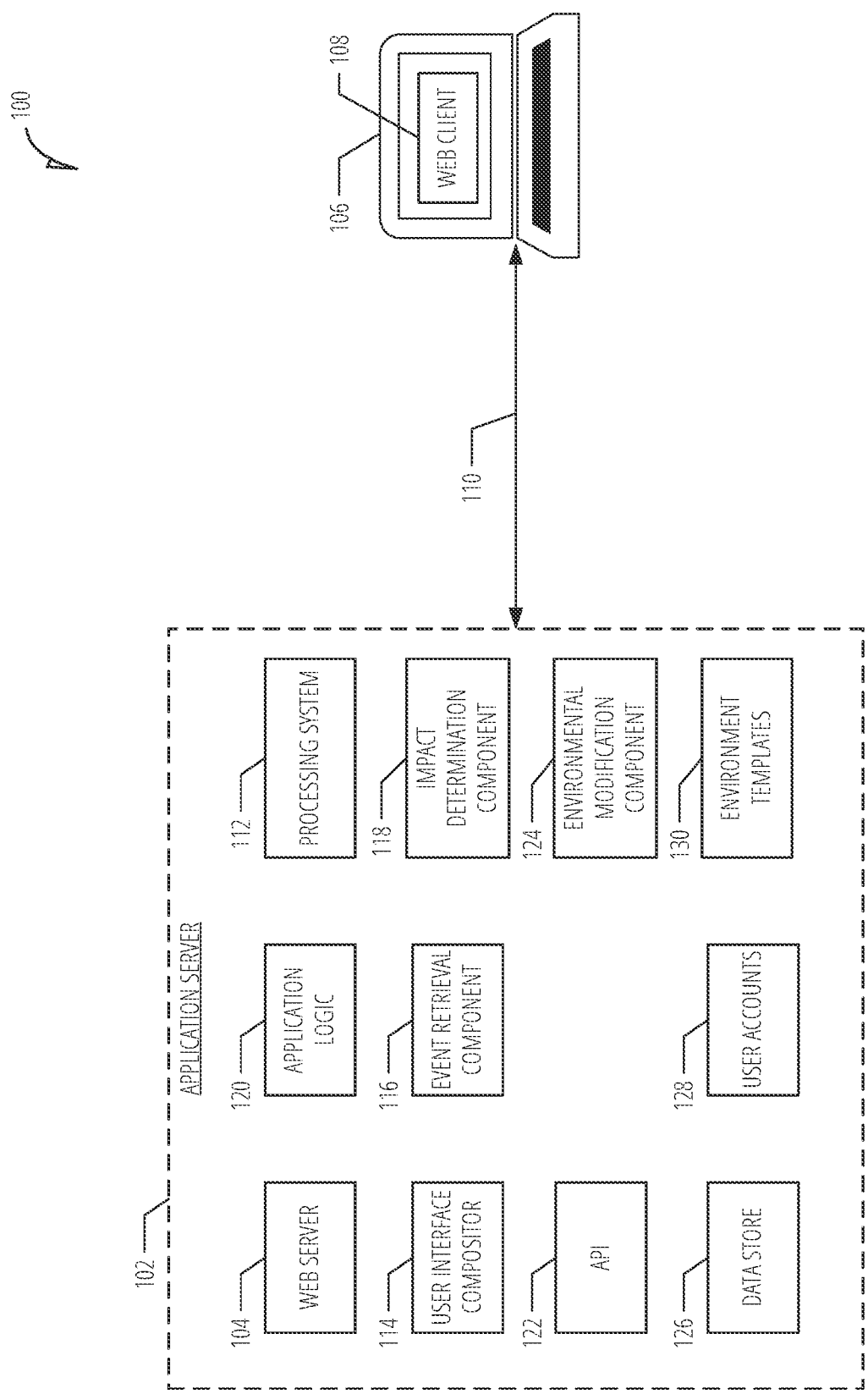
FIG. 1 is an illustration of components of a client device and an application server, according to various examples.

As indicated in the Background, users often turn to electronic calendar systems to provide functionality that is not able to be performed using a written calendar. The user interfaces of these electronic systems, however, often replicate the look and feel of a written calendar. For example, an interface may include a table format with columns for days of the week and rows for each week. A list agenda view may be used that indicates their upcoming appointments. Additionally, the event data often mirrors what would be written down such as a start time, a location, an end time, etc. Existing electronic calendar applications fail to utilize the benefits of an electronic format to present the events in a different manner and do not take advantage of interfacing with other electronic systems to enhance the event data.

As described herein in more detail, electronic calendar systems may be improved in a number of manners. First, instead of a tabular or list-based interface, a path-based graphical interface is used that configures an event as a point on a path. The path be shown in a perspective format such that the closer to an event is in time to the current time, the closer the event is to foreground. Furthermore, the path itself may be configured to change based on the event. For example, if a decision is to be made at the event, the path may be presented in a split manner.

A second described improvement to electronic calendar systems is the ability to automatically query, analysis, and present information of an event beyond its location and duration. For example, the described system may be access financial information of the user and determine what impact a decision may make on the user's finances. These potential impacts may be presented to the user in the interface itself without any additional user input.

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., RAM, cache, hard drive) accessible by the component via an API or other program communication method. Similarly, the variables may be assumed to have default values should a specific value not be described. User interfaces may be provided for an end-user or administrator to edit the variable values in some instances.

In various examples described herein, user interfaces are described as being presented to a computing device. Presentation may include transmitting data (e.g., a hypertext markup language file) from a first device (such as a web server) to the computing device for rendering on a display device of the computing device via a rendering engine such as a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples these portions may be displayed on a screen at the same time, in other examples the portions/elements may be displayed on separate screens such that not all of the portions/elements are displayed simultaneously. Unless indicated as such, the use of "presenting a user interface" does not infer either one of these options.

Additionally, the elements and portions are sometimes described as being configured for a certain purpose. For example, an input element may be described as being configured to receive an input string. In this context, "configured to" may mean presentation of a user interface element that is capable of receiving user input. Thus, the input element may be an empty text box or a drop-down menu, among others. "Configured to" may additionally mean computer executable code processes interactions with the element/portion based on an event handler. Thus, a "search" button element may be configured to pass text received in the input element to a search routine that formats and executes a structured query language (SQL) query with respect to a database.

FIG. 1 is an illustration 100 of components of a client device and an application server, according to various examples. FIG. 1 an application server 102, a web server 104, a client device 106, a web client 108, a data 110, a processing system 112, a user interface compositor 114, an event retrieval component 116, an impact determination component 118, an application logic 120, an API 122, an environment modification component 124, a data store 126, a user accounts 128, and environment templates 130.

Application server 102 is illustrated as set of separate elements (e.g., component, logic, etc.). However, the functionality of multiple, individual elements may be performed by a single element. An element may represent computer program code that is executable by processing system 112. The program code may be stored on a storage device (e.g., data store 126) and loaded into a memory of the processing system 112 for execution. Portions of the program code may be executed in a parallel across multiple processing units (e.g., a core of a general-purpose computer processor, a graphical processing unit, an application specific integrated circuit, etc.) of processing system 112. Execution of the code may be performed on a single device or distributed across multiple devices. In some examples, the program code may be executed on a cloud platform (e.g., MICROSOFT AZURE® and AMAZON EC2®) using shared computing infrastructure.

Client device 106 may be a computing device which may be, but is not limited to, a smartphone, tablet, laptop, multi-processor system, microprocessor-based or programmable consumer electronics, game console, set-top box, or other device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

Client device 106 and application server 102 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks or peer-to-peer (e.g., Bluetooth®, Wi-Fi Direct), or other combinations or permutations of network protocols and network types. The network may include a Local Area Network (LAN) or Wide-Area Network (WAN), or combinations of LAN's or WAN's, such as the Internet. Client device 106 and application server 102 may communicate data 110 over the network. Data 110 may include a web application, user inputs, etc., as discussed herein.

In some examples, the communication may occur using an application programming interface (API) such as API 122. An API provides a method for computing processes to exchange data. A web-based API (e.g., API 122) may permit communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored in a Database (e.g., data store 126)

APIs may also be defined in frameworks provided by an operating system (OS) to access data in an application that an application may not regularly be permitted to access. For example, the OS may define an API call to obtain the current location of a mobile device the OS is installed on. In another example, an application provider may use an API call to request a be authenticated using a biometric sensor on the mobile device. By segregating any underlying biometric data—e.g., by using a secure element—the risk of unauthorized transmission of the biometric data may be lowered.

Application server 102 may include web server 104 to enable data exchanges with client device 106 via web client 108. Although generally discussed in the context of delivering webpages via the Hypertext Transfer Protocol (HTTP), other network protocols may be utilized by web server 104 (e.g., File Transfer Protocol, Telnet, Secure Shell, etc.). A user may enter in a uniform resource identifier (URI) into web client 108 (e.g., the INTERNET EXPLORER® web browser by Microsoft Corporation or SAFARI® web browser by Apple Inc.) that corresponds to the logical location (e.g., an Internet Protocol address) of web server 104. In response, web server 104 may transmit a web page that is rendered on a display device of a client device (e.g., a mobile phone, desktop computer, etc.).

Additionally, web server 104 may enable a user to interact with one or more web applications provided in a transmitted web page or as part of an application executing on client device 106. A web application may provide user interface (UI) components that are rendered on a display device of client device 106. The user may interact (e.g., select, move, enter text into) with the UI components, and, based on the interaction, the web application may update one or more portions of the web page. A web application may be executed in whole, or in part, locally on client device 106. The web application may populate the UI components with data from external sources or internal sources (e.g., data store 126) in various examples.

In various examples, the web application is a dynamic user interface that includes an environment illustrating decision points based on events of the user and impacts to the user based on which decision is made. For example, an event may be grocery shopping and the decision point may be whether to pay with a credit card or debit card. The user interface may project the financial impact of each decision on the user interface. The dynamic user interface may be presented in a variety of environmental areas, such as a road where each event for the user is placed on the road. Further details about the dynamic user interface are discussed below in the context of other elements of application server 102.

The web application may be executed according to application logic 120. Application logic 120 may use the various elements of application server 102 to implement the web application. For example, application logic 120 may issue API calls to retrieve or store data from data store 126 and transmit it for display on client device 106. Similarly, data entered by a user into a UI component may be transmitted using API 122 back to the web server 104. Application logic 120 may use other elements (e.g., user interface compositor 114, event retrieval component 116, impact determination component 118, etc.) of application server 102 to perform functionality associated with the web application as described further herein.

Data store 126 may store data that is used by application server 102. Data store 126 is depicted as singular element, but may in actuality be multiple data stores. The specific storage layout and model used in by data store 126 may take a number of forms—indeed, a data store 126 may utilize multiple models. Data store 126 may be, but is not limited to, a relational database (e.g., SQL), non-relational database (NoSQL) a flat file database, object model, document details model, graph database, shared ledger (e.g., blockchain), or a file system hierarchy. Data store 126 may store data on one or more storage devices (e.g., a hard disk, random access memory (RAM), etc.). The storage devices may be in standalone arrays, part of one or more servers, and may be located in one or more geographic areas.

User accounts 128 may include user profiles on users of application server 102. A user profile may include credential information such as a username and hash of a password. The user profile may identify a set of events as they pertain to the user. An event may include a start time/date, duration, and type. Certain types of events may have one or more decisions that the user needs to make surrounding the event. For example, if an event is a parent/teacher conference there may be an opportunity to pay for tuition, a field trip, and make a donation. More details about events and decisions are discussed in the context of the remaining components and figure User accounts 128 may also include a location of which electronic repository to obtain the event data. For example, an account may identify a third-party service that manages the user's events (e.g., Google Calendar™ calendar application or Office 365® by Microsoft). The account may include a token (e.g., using OAuth) or login credentials that authorize application server 102 to retrieve the events in a defined format such as JavaScript Object Notation (JSON) or extensible markup language (XML) over an API. In other examples, the user may use application server 102 for managing events. In some examples, multiple sources of events may be used and combined in the user account. Each source may have a corresponding token or login credentials in order to retrieve the events.

The user account profile may also include preferences of the user. For example, the user may indicate what environment template to use for the visualization of their events. Another preference may be to further limit the number of events shown in a template (as discussed further below) beyond the template's default.

A user account profile may also be linked (e.g., using credentials, APIs, tokens) to one or more financial accounts, such as checking accounts, savings accounts, credit cards, etc. A financial account may include an interest rate-either to the benefit of the user or incurred on balances of the user.

A user account profile may identify (e.g., as stored in an entry in data store 126) one or more goals of the users. A goal may include a savings goal such as buying a car, buying a house, taking a vacation, retirement, etc. A goal may identify a goal amount (e.g., $25,000 for a car) and a date that the goal is amount is to be saved.

Application server 102 may also gather, using API 122, data related to decisions that are to be made by a user. For example, application server 102 may request and receive data on tuition rates for colleges, current interest rates for loans, prices for food choices at a restaurant, etc. The data may be received from a third-party knowledge data store in some examples. In other examples, a screen scraper script may be used to read the data from a webpage.

In various examples, a user profile may also include entries on which types of on-demand work services (e.g., gig economy jobs) a user is currently participating in and credential/authorization to obtain data from those services.

In various examples, environment templates 130 are used to generate a visualization of a user's events, decision points, and potential impacts of the decision. A template may be a structured data file that adheres to a schema for elements (e.g., media, text, graphics, etc.) in the file. For example, an extensible markup language (XML) schema may define a hierarchy of elements that each environment template may have, including but not limited to: path data to raster images (JPEG, PNG, etc.) or vector files (e.g., scalable vector graphics) with absolute or relative placement location coordinates for each, potential locations for event data, Bezier path data, variant information based on screen size (e.g., pixel resolution) or device type (e.g., desktop vs mobile phone), etc. A translation file such as an Extensible Stylesheet Language Transformations (XSLT), may be used to convert the elements of the template to a webpage format such as hypertext markup language (HTML) file for use by web server 104.

Templates may be designed with respect to a common base theme. For example, one template may have a road theme whereas another may have a river theme. A template may include a statics background image with respect to the theme in some example—as well as dynamic elements such as animations or interactive buttons, etc. Within the theme, different graphics or road/river paths may be used depending on the type of event and its potential impact to a user. For example, certain event types may cause a fork in the road to be presented, an obstacle to be placed on top of the path, or depict an increasing terrain (such as a hill).

In various examples, a template may specify the number of events to display on a screen at one time and their respective locations. Event data location may include absolute or relative coordinate information of where event data should be placed within a user interface. By preselecting locations and the number of events for a template, the user interface may be not become cluttered and unreadable. Similarly, the number of decision options may be limited. The user interface may also be responsive according to the type of device, size of the display (in pixel resolution), or orientation (e.g., landscape vs vertical).

The events may have multiple components such as a time duration, description, location, etc. Additionally, impact determination component 118 may generate financial outcomes for different choices made with respect to the events. A template may identify the location of where to present the financial impacts.

For example, there may be a parent template with child templates that inherit the elements of the parent, but each child template may override some of the elements. For example, there may be child templates for a certain range of screen sizes, device types, etc. Thus, consider a parent template for a straight road environment that includes placement for five events. A child template may limit the number or events to three if the device display is less than six inches diagonally and scale the graphics down to 50%.

An environment template may also indicate a font family, size, and style (e.g., bold) for use by the events and any associated decisions. An environment template may also identify an order of events. For example, a first event placement area may be associated with the next (in time) event of a user, a second event placement area may be associated with an event subsequent to the next event, etc. In various examples, the events that are closest in time to the current time are in the foreground (e.g., according to the perspective of the path such that the road has more width in the foreground) and each subsequent event is placed farther into the background. In some cases, an event template may include one or more placement areas for past events.

An environment template may also define what graphics to display or road paths to use based on the significance or type of event. These definitions may include a trigger event (e.g., a type, threshold dollar change) and a corresponding effect. For example, if there is a financial decision that may result in a negative balance, an obstacle element (e.g., a rock) may be presented on the road. An animation may be presented of a car taking one of the paths after a user selection. Or a split in the road may be presented if there are only two choices. In another example, weather effects may be added to the graphics, such as rain.

The environment template may also include a visibility parameter for elements that indicates whether to show or hide which elements based on a type of event or in response to a decision made by the user. As above, there may be a trigger and effect stored in the environment template. For example, if the event is a life event (e.g., buying a house) a house graphic may be presented next to the event along with the impact different priced homes may have on their retirement age.

Impact determination component 118 may determine ways in which a decision point may impact a user. In some instances, the impact may be financial. For example, consider that an event may have an associated decision of how to pay for the next semester of tuition for the user's child. Impact determination component 118 may access the user profile associated with the user and retrieve a listing of the financial accounts of the user.

Each of the financial accounts may have a different impact on the user's financial future. For example, a user may have a choice to pay with a credit card or a debit card. Impact determination component 118 may calculate a projected balance (e.g., a specific account, total net worth, etc.) based on the two payment methods. The calculation may take into consider the interest rate of the two payment methods and past payment behavior of the user. For example, if the user only pays the minimum on their credit card, projected balance may decrease by the cost of tuition and the interest that will incur. In contrast, the projected balance when using a debit card may just be the cost of the tuition. More complex projections may be made that taking into consideration the time value of money, current inflation rates, etc.

Impact determination component 118 may also be used to calculate the potential impact on a goal of the user. For example, if the user is saving for a car, spending more money on a dinner out may lengthen the amount of time needed to save for the car. The calculation may be made by first calculating the existing average amount the user has been saving for the car per month, and then determine if the cash flow impact for choosing one payment method over another (or simply the amount spent) would affect the ability of the user to save that same amount in future months.

To help with the calculation, impact determination component 118 may access a budget and current spending of the user. A budget may define spending amounts per category for the user and either application server 102 or a third-party service may track spending of the user with respect to those categories. Thus, if spending over $X dollars on dinner exceeds a user's "going out to eat" budget, the ability to save for the car may be impacted.

Impact determination component 118 may also be used to predict the financial decisions that may be made at an event. Predictions may come from a variety of sources such as machine learning models, look up tables, or external sources based on the type of event. For example, personalized predictions may be made based on past user behavior with respect to the type of event and location of the event. Thus, if a user is going to a doctor where they have gone to before (which may be determined using GPS data of a mobile phone), application server 102 may access past transaction data made at the same location and predict a possible copay amount. If there is no personalized history available, application server 102 may access the average transaction cost made at the location.

Similarly, impact determination component 118 may look up (e.g., using a third-party API) an expense rating (e.g., one star, two star) for a restaurant that may give an indication of the average amount spent at the restaurant. Accordingly, if there is a decision to be made of where to go out to eat, impact determination component 118 may present multiple options at multiple price points for the user. As with the other examples above, the impact with respect to a goal of the user may also be presented alongside the choice of restaurant.

User interface compositor 114 may execute a number of subprocesses to generate a user interface for presentation on client device 106. For example, user interface compositor 114 may retrieve data that is to be presented as part of a user interface. The data may include an environment template, event data, assessed impacts from impact determination component 118, among others. In various examples, the interface is formatted using a canvas element in accordance with HTML5. The environment template may be selected from a set of environment templates based on a user preference, in some examples. Media (e.g., background images) may be retrieved and placed in the canvas according to event template. Similarly, paths may be drawn on the canvas according to Bezier curves defined the environmental template.

User interface compositor 114 may parse the retrieved environment template to determine the number of events that may be placed in the template. User interface compositor 114 may then retrieve the number of events according to the template that are occurring contemporaneously or in the future at the time the request for the interface is made. Each of the retrieved events may then be placed into a location according to location information in the environment template. Similarly, user interface compositor 114 may retrieve any impact determinations made by impact determination component 118 and place the impacts in the canvas according to the environment template.

In various examples, environment modification component 124 may be used to modify the environment presented by user interface compositor 114. For example, if a type of event is significant (e.g., above a certain financial threshold, is a life event), a different environment template may be used. Or, as discussed previously, an obstacle may be presented in the path of the interface.

When an event has passed in time, user interface compositor 114 may update the interface. For example, an animation may be made that moves the current event off the screen (e.g., disappears or slides down), shifts other events down a location (e.g., closer to the foreground), and retrieves the next event.

In addition to planned events, application server 102 may be used to predict and manage on-demand work services (e.g., gig economy) that may be performed by the user (e.g., food deliver, car ride services) and how they may fit into the user's day. For example, impact determination component 118 may calculate free time in the user schedule. During that time user interface compositor 114 may present how much money a user may make during that time period for various on-demand work services as calculated by impact determination component 118. Impact determination component 118 may make such a determination using real-time data (via an API or screen scraping) of the average amount users are currently charging for services during those free times.

Figure 2:
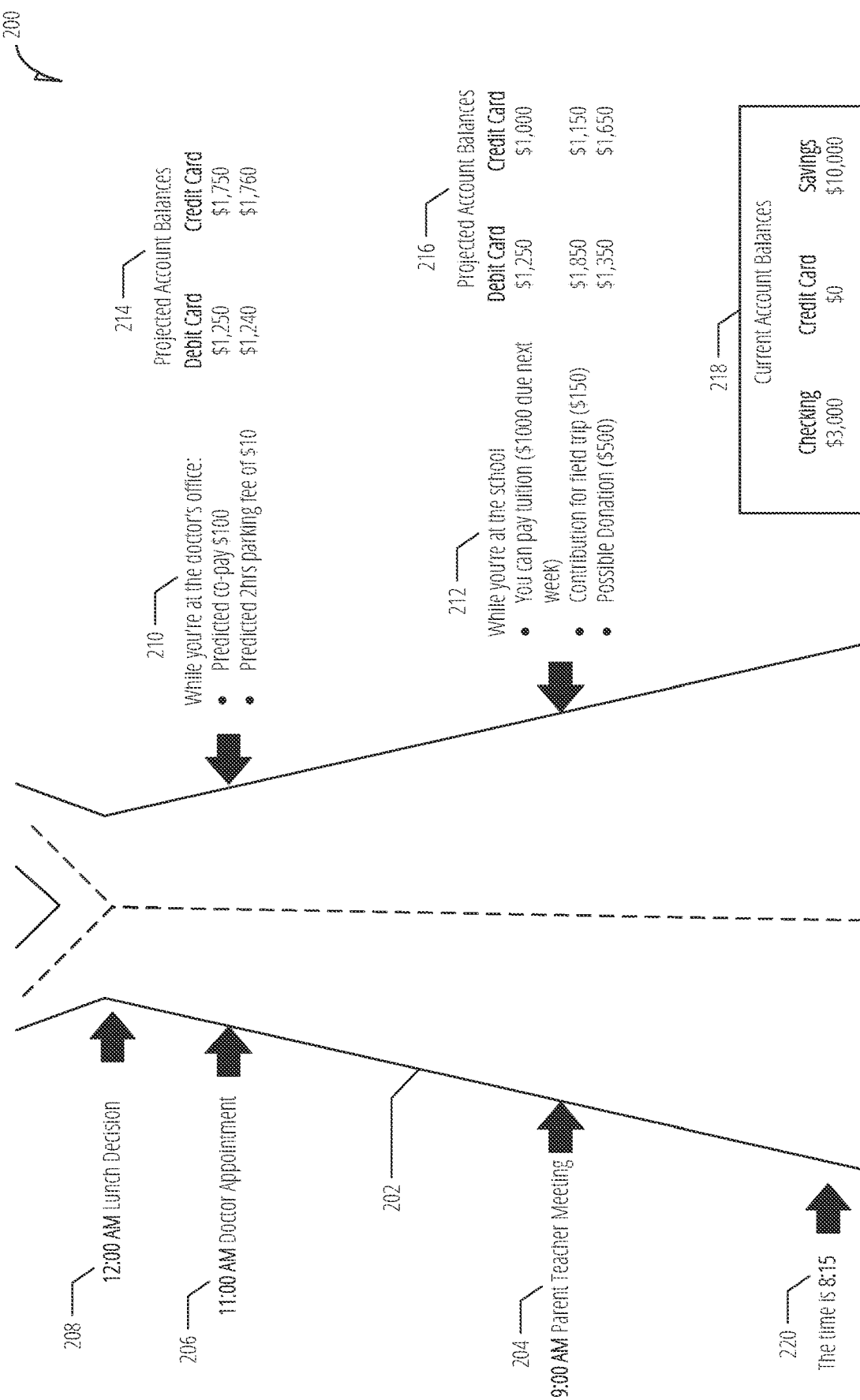
FIG. 2 illustrates a road-themed event user interface, according to various examples.

FIG. 2 illustrates a road-themed event user interface 200, according to various examples. User interface 200 includes a road path 202, an event 204, an event 206, a decision event 208, a prediction 210, a prediction 212, a projected balance 214, a projected balance 216, a current balances 218, and a current time 220. User interface 200 may be presented on web client 108 in various examples as the output of user interface compositor 114. The placement, formatting, and labels used within user interface 200 are only one example, and others may be used.

Figure 3:
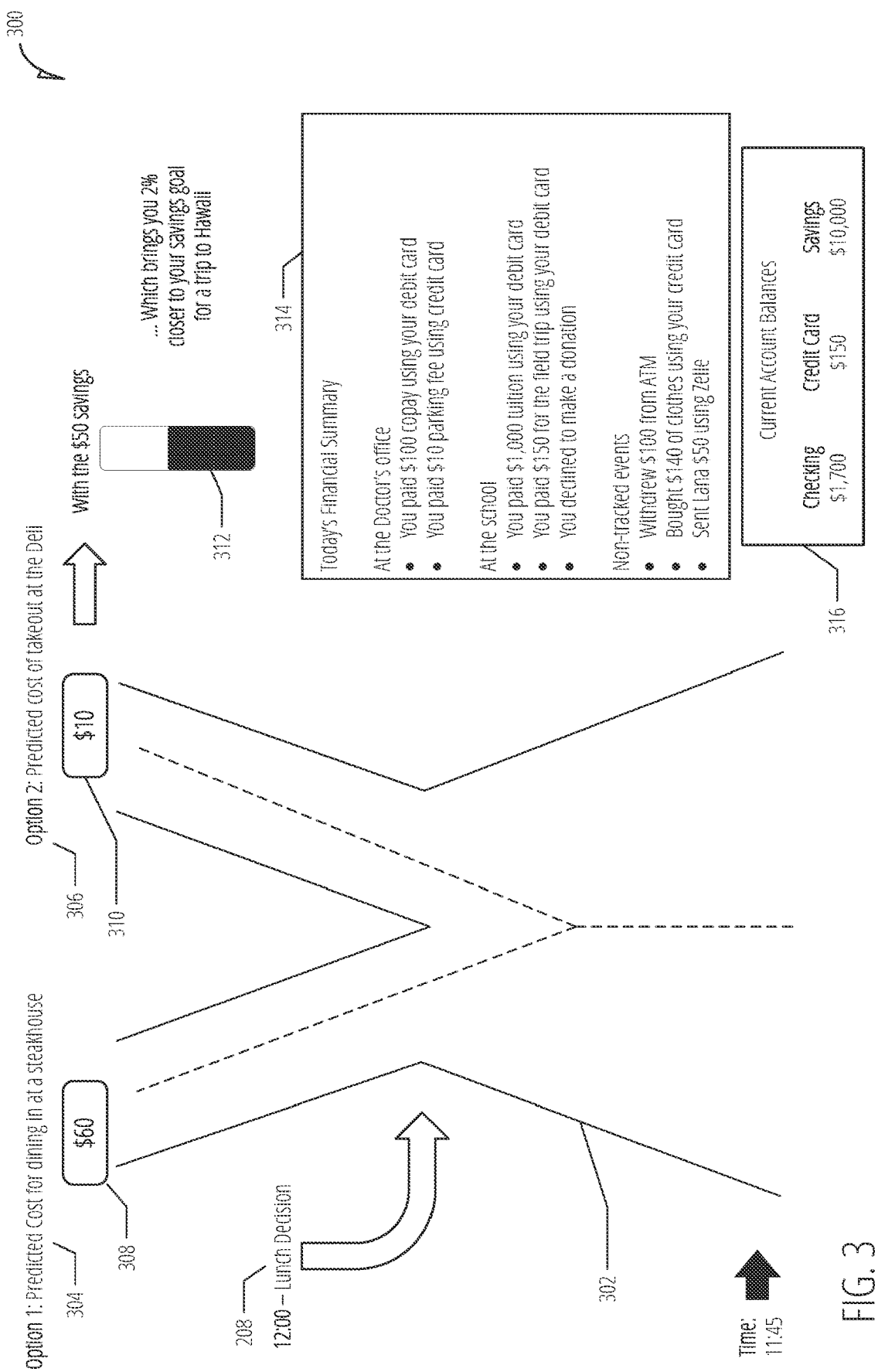
FIG. 3 illustrates a decision event user interface, according to various examples.

As illustrated, road path 202 is presented in a perspective format with a fork in the road at decision event 208 (discussed further in FIG. 3). On the left side of road path 202 events such as event 204 and event 206 are presented with their start times. At the bottom of road path 202 the current time is shown. As can be seen the further to the top (e.g., into background with respect to the road perspective) the farther in time the events are from current time 220. Current balances 218 includes the current balances of accounts of the user as may be retrieved from their user account profile.

In horizontal alignment with an event, but on the right-hand side of road path 202, a prediction and a project balance associated with the event are presented. For example, event 204 is for a parent-teacher meeting. An output of impact determination component 118 may have indicated that three possible payments may be made at such an event, which are presented at prediction 212. Impact determination component 118 may further have calculated the different project balances (e.g., projected balance 216) if a debit card vs a credit card is used for each of the three predictions. Similarly, for the doctor's appointment event 206, prediction 210 and projected balance 214 are presented.

FIG. 3 illustrates a decision event user interface 300, according to various examples. Decision event user interface 300 may be presented when it is the next event in a user's schedule. For example, with respect to FIG. 2, decision event user interface 300 may be presented after the time has passed event 204 and event 206. Decision event user interface 300 is illustrated as including decision event 208, split road path 302, option one 304, option two 306, predicted cost 308, predicted cost 310, goal progress visualization 312, summary 314, and current balances 316.

Decision event user interface 300 may be used to help a user better visualize how their choices impact their goals and projected balances. For example, split road path 302 indicates that if option one 304 is chosen the predicated cost is $60. If the user chooses option two 306, however, the predicted cost is only $10 and the remaining $50 saved could be used for their vacation savings goal as illustrated as goal progress visualization 312. A user may select (e.g., click with an input device) either predicted cost 308 or predicted cost 310 to indicate to application server 102 their choice.

In various examples, summary 314 is based on user inputs (not shown) made on user interface 200. For example, a user may click one of the projected account balance amounts in projected balance 216 to indicate they have paid or will pay the tuition with their credit card.

Figure 4:
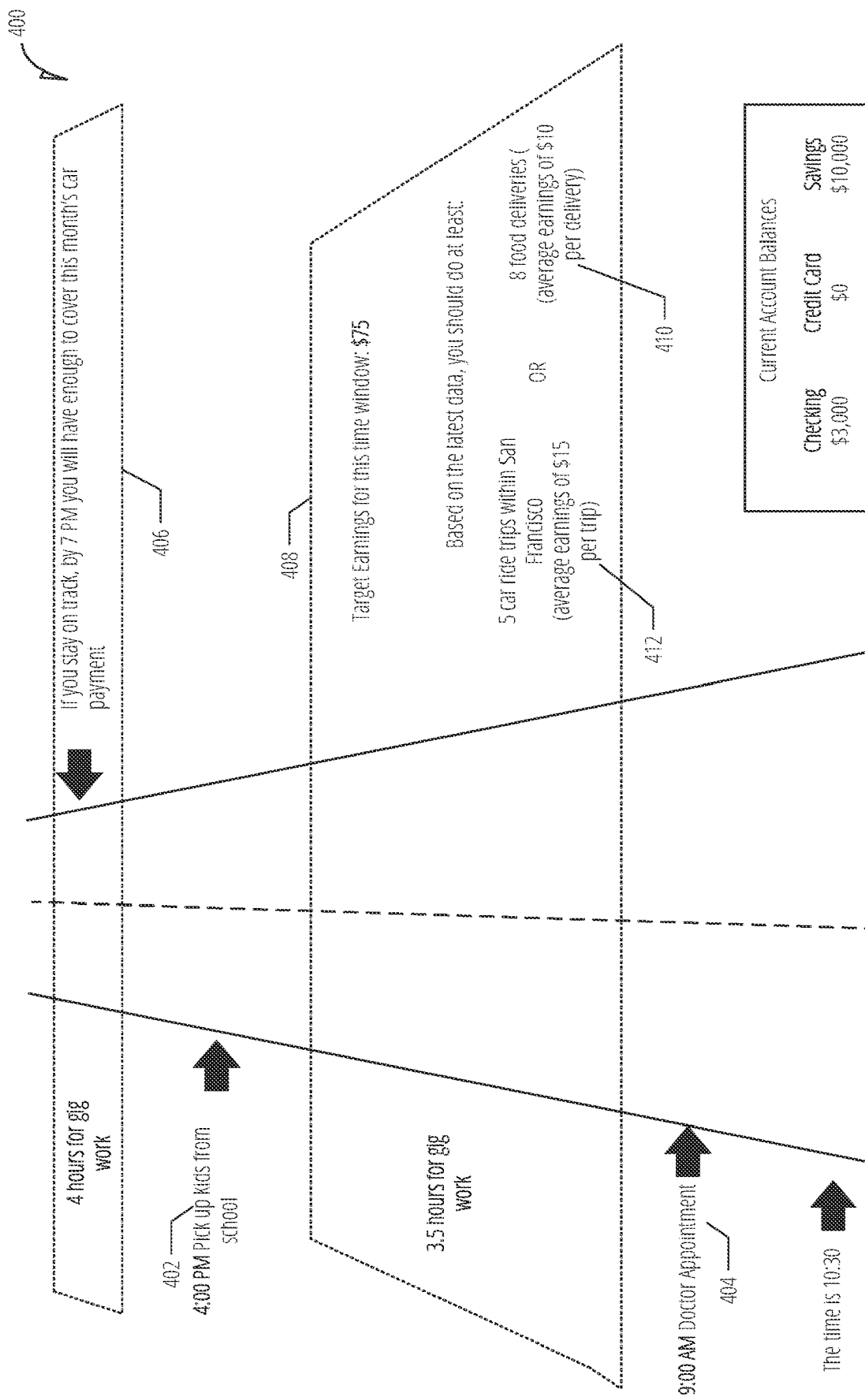
FIG. 4 illustrates a combination event user interface, according to various examples.

FIG. 4 illustrates a combination event user interface 400, according to various examples. Combination event user interface 400 may present a combination of events and on-demand work opportunities. For example, combination event user interface 400 includes event 402 and 404, but also includes work window 406 and work window 408. Within the work windows, projected earnings may be presented according to the on-demand work services indicated in a user's profile. For example, work window 408 includes projected earnings 410 that indicates if eight food deliveries are made a user may meet their $75 target earnings. Similarly projected earnings 412 indicates the user may provide five car trips in the San Francisco area to meet that same target.

In various examples, combination event user interface 400 includes a toggle element (not shown) that allows the user to switch between a combination information and an event user interface such as presented in FIG. 2 and FIG. 3. In some examples, a user interface may be generated that does not present any events, but still includes the work windows.

Figure 5:
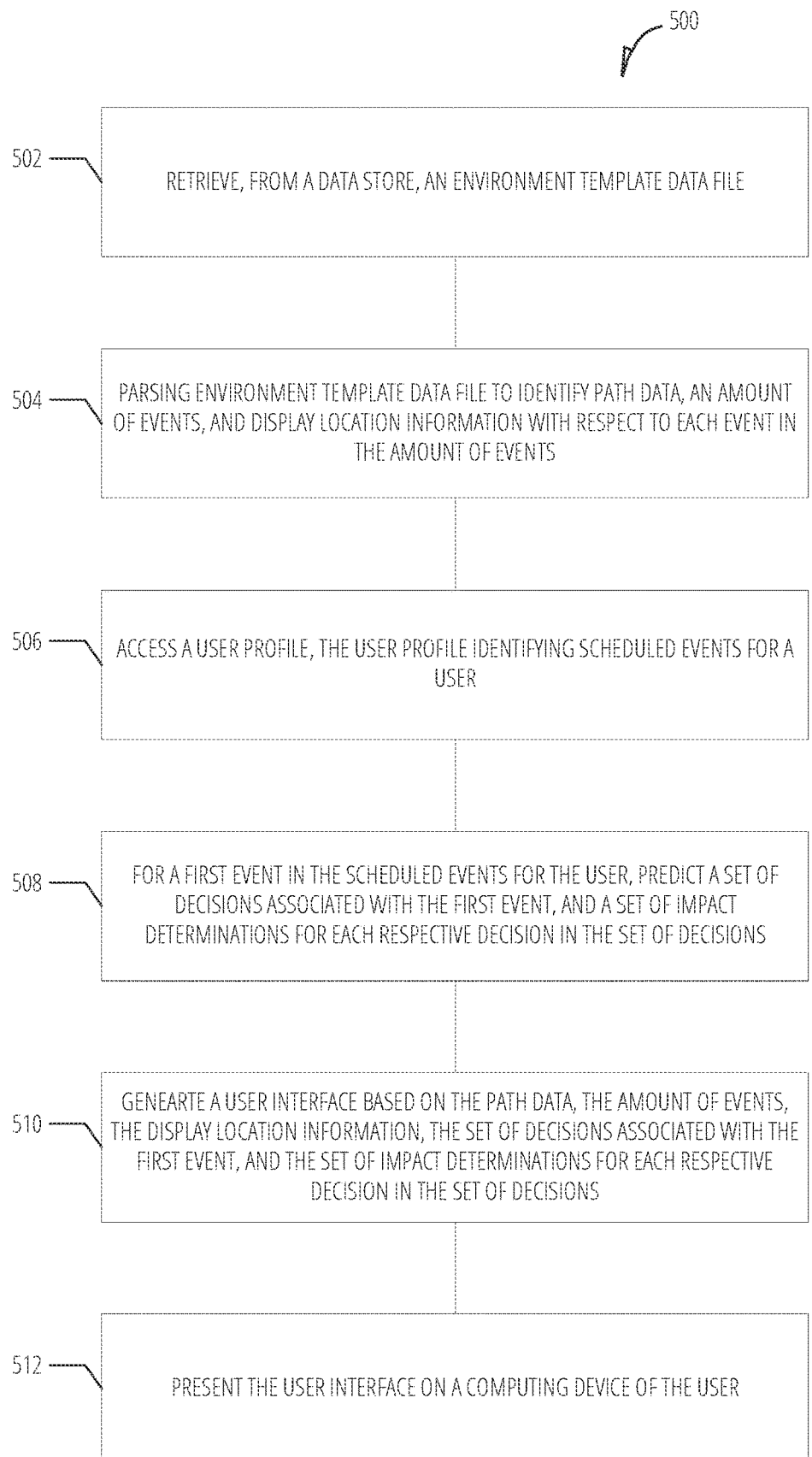
FIG. 5 is a flowchart diagram identifying operations of a method of generating a user interface, according to various examples.

FIG. 5 is a flowchart illustrating a method for generating a user interface, according to various examples. The method is represented as a set of blocks that describe operation 502 to operation 512 of flowchart 500. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 5. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

In various examples, flowchart 500 includes operation 502 for retrieving, from a data store (e.g., data store 126), an environment template data file (e.g., one of environment templates 130). The environment template data file may be retrieved as part of a request from a computing device of a user. For example, a user may open an app on their computing device and login using their credentials to application server 102 at which time application server 102 may retrieve the template data file to being generating an interface for the user. The template data file may be one in which the user has previously indicated to use (e.g., according to a preference in their user profile).

In various examples, flowchart 500 includes operation 504 for parsing (e.g., using user interface compositor 114), using a processing device, the environment template data file to identify path data, an amount of events, and display location information with respect to each event in the amount of events. Parsing may include string matching, by the processing device, for elements according to a schema. Thus, parsing may look for "<event amount>" in the data file. Similar searches may be made to determine the path data and display location information.

In various examples, flowchart 500 includes operation 506 for accessing a user profile (e.g., from user accounts 128), the user profile identifying scheduled events for a user. The events may be identified using event retrieval component 116 in various examples. An event may include an end time and location in various examples.

In various examples, flowchart 500 includes operation 508 for a first event in the scheduled events for the user, predicting using the processing device, a set of decisions (e.g., using impact determination component 118 associated with the first event, and a set of impact determinations for each respective decision in the set of decisions (e.g., using impact determination component 118)

In various examples, flowchart 500 includes operation 510 for generating a user interface based on the path data, the amount of events, the display location information, the set of decisions associated with the first event, and the set of impact determinations for each respective decision in the set of decisions. Generating the interface may completed by user interface compositor 114 as discussed with respect to the previous figures. In various examples, flowchart 500 includes operation 512 for presenting the user interface on a computing device of the user.

The computer-implemented method may also include where the path data includes a plurality of coordinate points. Generating the user interface may include drawing (e.g., using a graphics API of an operating system of the computing device) a line between the plurality of coordinate points. The computer-implemented method may also include where the plurality of coordinate points define a straight road path (e.g., such as presented in FIG. 2). The computer-implemented method may also include where the plurality of coordinate points define a forked road path (e.g., such as presented in FIG. 3).

The computer-implemented method may also further include retrieving a start time of the first event, retrieving a start time of a second event of the scheduled events, determining that the start time of the second event occurs subsequent to the start time of the first event. Generating the user interface may include placing the first event in a foreground of the user interface and the second event farther in the background with respect to the first event. The spatial orientation of the foreground and background may be defined in the environment template data file. For example, the data file may indicate that the foreground is the bottom of the displayed interface and the background is the top of the displayed interface.

Generating the user interface may include determining a type of the first event corresponds to a trigger in the environment template data file, and modifying the user interface in accordance with an effect tied to the trigger.

The computer-implemented method may also include where generating the user interface includes adding a first impact determination of the set of impact determinations on one fork of the forked road path and adding a second impact determination of the set of impact determinations on another fork of the forked road path. Other technical features may be readily apparent to one skilled in the art from the following figures, descriptions, and claims.

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 6:
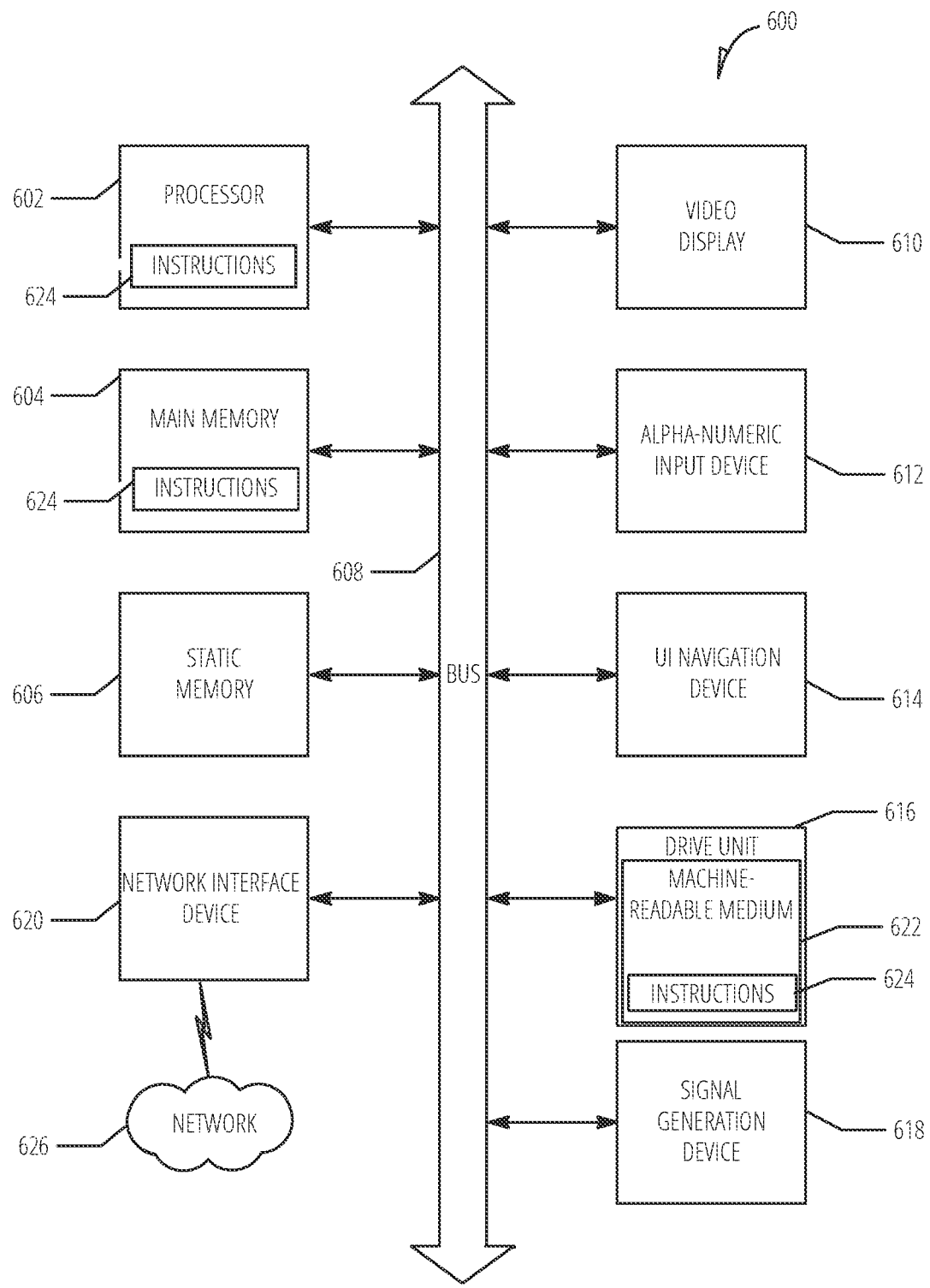
FIG. 6 is a block diagram illustrating an example machine upon which any one or more of the techniques (e.g., methodologies) discussed herein may be performed, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, 4G LTE/LTE-A or WiMAX networks, and 5G). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A computer-implemented method comprising:
   retrieving, from a data store, an environment template data file;
   parsing, using a processing device, the environment template data file to identify:
     path data;
     a number of events to be displayed; and
     a display location information with respect to each event in the number of events to be displayed;
   accessing a user profile, the user profile identifying scheduled events for a user;
   generating, using the processing device, an event user interface based on the path data, the number of events to be displayed, and the display location information;
   predicting, using the processing device, a set of decisions associated with a first event in the scheduled events, and a set of impact determinations for each respective decision in the set of decisions;
   including in the event user interface, using the processing device, the set of decisions associated with the first event, and the set of impact determinations for each respective decision in the set of decisions; and
   presenting the event user interface on a computing device of the user.

2. The computer-implemented method of claim 1, wherein generating the event user interface includes:
   presenting a forked path;
   adding a first impact determination of the set of impact determinations on one fork of the forked path; and
   adding a second impact determination of the set of impact determinations on another fork of the forked path.

3. The computer-implemented method of claim 1, further comprising:
   parsing, using a processing device, the environment template data file to identify:
     a number of on-demand work services windows to be displayed; and
     a display location information with respect to each on-demand work services window in the number of on-demand work services windows to be displayed;
   accessing the user profile, the user profile identifying scheduled on-demand work services windows for a user;
   generating, using the processing device, a combined user interface based on the path data, the number of events to be displayed, the number of on-demand work services windows to be displayed, the display location information with respect to each event in the number of events to be displayed, the display location information with respect to each on-demand work services window in the number of on-demand work services windows to be displayed; and
   presenting the combined user interface on a computing device of the user.

4. The computer-implemented method of claim 3, further comprising:
   presenting, in the combined user interface, using the processing device, projected earnings for each on-demand work services window according to the scheduled on-demand work services windows on the user profile.

5. The computer-implemented method of claim 3, further comprising:
   presenting a toggle element in the combined user interface;
   receiving a selection of the toggle element; and
   based on the selection, switching the combined user interface to the event user interface.

6. The computer-implemented method of claim 1, wherein the environment template data file is a child environment template data file of a parent environment template data file, the child environment template data file associated with a device type of the computing device of the user.

7. A non-transitory computer-readable medium comprising instructions, which when executed by at least one processor, configure the at least one processor to perform operations comprising:
retrieving, from a data store, an environment template data file;
parsing the environment template data file to identify:
path data;
a number of events to be displayed; and
a display location information with respect to each event in the number of events to be displayed;
accessing a user profile, the user profile identifying scheduled events for a user;
generating an event user interface based on the path data, the number of events to be displayed, the display location information;
predicting a set of decisions associated with a first event in the scheduled events, and a set of impact determinations for each respective decision in the set of decisions;
including in the event user interface the set of decisions associated with the first event, and the set of impact determinations for each respective decision in the set of decisions; and
presenting the event user interface on a computing device of the user.

8. The non-transitory computer-readable medium of claim 7, wherein the path data includes a plurality of coordinate points, wherein generating the event user interface includes drawing a line between the plurality of coordinate points, and wherein the plurality of coordinate points define at least one of a straight road path or a forked road path.

9. The non-transitory computer-readable medium of claim 7, wherein the environment template data file is a child environment template data file of a parent environment template data file, the child environment template data file associated with a device type of the computing device of the user.

10. The non-transitory computer-readable medium of claim 7, further comprising instructions, which when executed by the at least one processor, configure the at least one processor to perform operations comprising:
parsing the environment template data file to identify:
a number of on-demand work services windows to be displayed; and
a display location information with respect to each on-demand work services window in the number of on-demand work services windows to be displayed;
accessing the user profile, the user profile identifying scheduled on-demand work services windows for a user;
generating a combined user interface based on the path data, the number of events to be displayed, the number of on-demand work services windows to be displayed, the display location information with respect to each event in the number of events to be displayed, the display location information with respect to each on-demand work services window in the number of on-demand work services windows to be displayed; and
presenting the combined user interface on a computing device of the user.

11. The non-transitory computer-readable medium of claim 10, further comprising instructions, which when executed by the at least one processor, configure the at least one processor to perform operations comprising:
including, in the combined user interface, projected earnings for each on-demand work services window according to the scheduled on-demand work services windows on the user profile.

12. The non-transitory computer-readable medium of claim 10, further comprising instructions, which when executed by the at least one processor, configure the at least one processor to perform operations comprising:
presenting a toggle element in the combined user interface;
receiving a selection of the toggle element; and
based on the selection, switching the combined user interface to the event user interface.

13. A system comprising:
at least one processor; and
a storage device comprising instructions, which when executed by the at least one processor, configure the at least one processor to perform operations comprising:
retrieving, from a data store, an environment template data file;
parsing the environment template data file to identify:
path data;
a number of events to be displayed; and
a display location information with respect to each event in the number of events to be displayed;
accessing a user profile, the user profile identifying scheduled events for a user;
generating an event user interface based on the path data, the number of events to be displayed, and the display location information;
predicting a set of decisions associated with a first event in the scheduled events, and a set of impact determinations for each respective decision in the set of decisions;
including in the event user interface the set of decisions associated with the first event, and the set of impact determinations for each respective decision in the set of decisions; and
presenting the event user interface on a computing device of the user.

14. The system of claim 13, wherein the environment template data file is a child environment template data file of a parent environment template data file, the child environment template data file associated with a device type of the computing device of the user.

15. The system of claim 13, wherein the instructions, when executed by the at least one processor, further configure the at least one processor to:
parsing the environment template data file to identify:
a number of on-demand work services windows to be displayed; and
a display location information with respect to each on-demand work services window in the number of on-demand work services windows to be displayed;
accessing the user profile, the user profile identifying scheduled on-demand work services windows for a user;
generating a combined user interface based on the path data, the number of events to be displayed, the number of on-demand work services windows to be displayed, the display location information with respect to each event in the number of events to be displayed, the display location information with respect to each on-demand work services window in the number of on-demand work services windows to be displayed; and presenting the combined user interface on a computing device of the user.

16. The system of claim 15, wherein the instructions, when executed by the at least one processor, further configure the at least one processor to:

including, in the combined user interface, projected earnings for each on-demand work services window according to the scheduled on-demand work services windows on the user profile.

17. The system of claim 15, wherein the instructions, when executed by the at least one processor, further configure the at least one processor to:

presenting a toggle element in the combined user interface;

receiving a selection of the toggle element; and based on the selection, switching the combined user interface to the event user interface.

* * * * *